US012597555B2

(12) United States Patent
Francis

(10) Patent No.: US 12,597,555 B2
(45) Date of Patent: Apr. 7, 2026

(54) EDGE-FIT PINS

(71) Applicant: Murata Manufacturing Co., Ltd., Nagaokakyo (JP)

(72) Inventor: Lee Francis, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 753 days.

(21) Appl. No.: 17/926,195

(22) PCT Filed: Jun. 10, 2021

(86) PCT No.: PCT/US2021/036731
§ 371 (c)(1),
(2) Date: Nov. 18, 2022

(87) PCT Pub. No.: WO2021/257357
PCT Pub. Date: Dec. 23, 2021

(65) Prior Publication Data

US 2023/0178292 A1 Jun. 8, 2023

Related U.S. Application Data

(60) Provisional application No. 63/041,499, filed on Jun. 19, 2020.

(51) Int. Cl.
*H01F 27/29* (2006.01)
*H01F 27/28* (2006.01)
*H01R 12/70* (2011.01)

(52) U.S. Cl.
CPC ....... *H01F 27/292* (2013.01); *H01F 27/2828* (2013.01); *H01R 12/7076* (2013.01)

(58) Field of Classification Search
CPC ............... H01F 27/292; H01F 27/2828; H01F 2005/043; H01F 2005/046; H01F 5/04; H01R 12/7076; H01R 12/714
See application file for complete search history.

(56) References Cited

U.S. PATENT DOCUMENTS 3,668,616 A * 6/1972 Kukla .................... H01R 25/00 439/851
4,019,803 A * 4/1977 Schell .................... H01R 12/57 439/876

(Continued)

FOREIGN PATENT DOCUMENTS

CN 101032056 A * 9/2007 ........... H01R 12/721
DE 25 49 379 A1 3/1977

(Continued)

OTHER PUBLICATIONS

Official Communication issued in International Patent Application No. PCT/US2021/036731, mailed on Sep. 30, 2021.

(Continued)

*Primary Examiner* — Travis S Chambers
(74) *Attorney, Agent, or Firm* — Keating & Bennett, LLP

(57) ABSTRACT

A pin includes a head, a base connected to the head, a tail connected to the base, and clasps extending from the tail. The head includes two or more of the following: a hook, a first side notch, a second side notch, and an end notch. A module includes a substrate, a first pin mounted to the substrate at a first location, and a second pin mounted to the substrate at a second location. A distance between a tip of the first pin and a tip of the second pin is greater than a distance between the first location and the second location.

19 Claims, 14 Drawing Sheets

(56) References Cited

U.S. PATENT DOCUMENTS

| | | | | |
|---|---|---|---|---|
| 4,157,519 | A * | 6/1979 | Foster | H01F 5/04 439/456 |
| 4,890,085 | A | 12/1989 | Saito et al. | |
| 4,992,056 | A * | 2/1991 | Douty | H01R 12/714 439/83 |
| 5,724,016 | A * | 3/1998 | Roessler | H01F 41/046 336/200 |
| 6,208,232 | B1 * | 3/2001 | Chen | H01F 27/292 336/107 |
| 6,224,396 | B1 | 5/2001 | Chan et al. | |
| 6,507,260 | B1 | 1/2003 | Baumann et al. | |
| 6,558,182 | B1 | 5/2003 | Ohkita et al. | |
| 6,753,749 | B1 | 6/2004 | Chin | |
| 8,547,194 | B2 | 10/2013 | Tseng et al. | |
| 9,773,608 | B2 | 9/2017 | Rätz et al. | |
| 2002/0081900 | A1 | 6/2002 | Yu et al. | |
| 2003/0114029 | A1 * | 6/2003 | Lee | H01R 43/0256 439/83 |
| 2012/0038448 | A1 | 2/2012 | Kim et al. | |
| 2013/0207638 | A1 | 8/2013 | Gross et al. | |
| 2014/0242817 | A1 * | 8/2014 | Mongold | H01R 13/02 439/83 |
| 2023/0178286 | A1 * | 6/2023 | Francis | H01F 27/06 336/65 |

FOREIGN PATENT DOCUMENTS

| | | | | |
|---|---|---|---|---|
| JP | 05-38842 | U | 5/1993 | |
| JP | H08213256 | A * | 8/1996 | |
| TW | 200408168 | A * | 5/2004 | H01R 4/48 |
| WO | 2020/035675 | A1 | 2/2020 | |

OTHER PUBLICATIONS https://www.mac8japan.com/uploads/entry_meta/file_value/6021/en_2018a_cb-2.pdf, retrieved Jun. 12, 2020, 1 page.

https://wako-terminal.co.jp/newproduct.html, retrieved Jun. 12, 2020, 2 pages.

* cited by examiner

95

EDGE-FIT PINS

CROSS REFERENCE TO RELATED APPLICATIONS

This application claims the benefit of U.S. Provisional Patent Application No. 63/041,499 filed on Jun. 19, 2020. The entire contents of this application are hereby incorporated by reference.

In addition, U.S. Provisional Patent Application No. 63/041,438 filed on Jun. 19, 2020; and U.S. Provisional Patent Application No. 63/041,435 filed on Jun. 19, 2020 are hereby incorporated by reference.

BACKGROUND OF THE INVENTION

1. Field of the Invention

The present invention relates to edge-fit pins. More specifically, the present invention relates to edge-fit pins around which wire can be wound.

2. Description of the Related Art

FIG. 1 shows a known transformer assembly 100 that includes a core cup 101 and primary and secondary windings 102, 103 wound around the core cup 101. FIG. 2 shows an electronic assembly 120 that includes the transformer assembly 100 mounted to a printed circuit board (PCB) 110. Terminals 112 are connected to the PCB 110. The terminals 112 are edge mounted to the PCB 110 and can be used to connect the electronic assembly 120 to a host PCB (not shown). The primary and secondary windings 102, 103 can be attached to pads 111 on the PCB 110. In FIG. 2, for simplicity, only one of the primary or secondary windings 102 or 103 is shown. The primary and the secondary windings 102, 103 are hand-soldered to the pads 111 on the PCB 110, and such hand-soldered portions are not reliable over long-term thermal cycling tests.

SUMMARY OF THE INVENTION

To overcome the problems described above, preferred embodiments of the present invention provide edge-fit pins in which, when the edge-fit pins are attached to locations on a substate, the distance between the tips of adjacent edge-fit pins is greater than the distance, between adjacent locations where the edge-fit pins are attached to the substrate to allow wires to be wound around the edge-fit pins. For example, the heights of the pins as measured from the substrate can be different.

According to a preferred embodiment of the present invention, a pin includes a head, a base connected to the head, a tail connected to the base, and clasps extending from the tail. The head includes two or more of the following structures: a hook, a first side notch, a second side notch, and an end notch.

The two or more structures can include the hook, the first side notch, and the second side notch. The two or more structures can further include the end notch.

The pin can further include a leg that extends from a bottom of the tail.

The pin can further include a first bend that connects the base and the head. The first bend can be between 0° and 90° or can be between 90° and 180°. The pin can further include a second bend that connects the base and the tail and that is 90° or about 90°. The head includes a third bend that is between 90° and 180°.

Alternatively, the head can include a second bend that is between 90° and 180°.

According to a preferred embodiment of the present invention, a module includes a substrate, a pin of one of the various other preferred embodiments of the present invention mounted to the substrate, and a wire wound around the pin.

The module can further include a transformer, wherein the wire can be a winding of the transformer. The module can further include an additional pin mounted on the substrate, wherein the wire can be wound around the additional pin, and a distance between a tip of the pin and a tip of the additional pin can be greater than a distance between where the pin and the additional pin are mounted to the substrate.

The wire can be wound around the two or more structures. The wire can be soldered to the pin. The module can further include a casing that surrounds the substrate.

According to a preferred embodiment of the present invention, a strip includes first and second pins each defined by the pins according to one of the various other preferred embodiments of the present invention, wherein when the first and second pins are respectively mounted to first and second locations on a substrate, a distance between tips of the first and second pins can be greater than a distance between the first and second locations.

According to a preferred embodiment of the present invention, a module includes a substrate, a first pin mounted to the substrate at a first location, and a second pin mounted to the substrate at a second location. A distance between a tip of the first pin and a tip of the second pin is greater than a distance between the first location and the second location.

The first pin and the second pin can have different heights as measured from the substrate. The module can further include a wire wound around the tip of the first pin and the tip of the second pin. The module can further include a transformer, wherein the wire can be a winding of the transformer. Each of the first pin and the second pin can include two or more of the following structures: a hook, a first side notch, a second side notch, and an end notch.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

The following description is in all aspects illustrative and not restrictive and should not be construed to restrict the applications or uses of preferred embodiments of the present invention in any manner.

FIGS. 3-6, 9, and 10 show pins 10, 30 that can be edge fit to a side of a substrate, and FIGS. 11-14, and 17 show pins 50, 70 that also can be edge fit to a side of a substrate. The pins 10, 30 define a pair of pins of different heights, and the pins 50, 70 define a pair of pins of different heights. When attached to a substrate, the pins 30, 70 extend farther from the substrate than pins 10, 50. The pins 10, 30, 50, 70 can be made by any suitable method, including, for example, stamping a base metal sheet. The pins 10, 30, 50, 70 can be made of any suitable metallic material, including, for example, copper with a nickel/tin finish.

Figure 17:
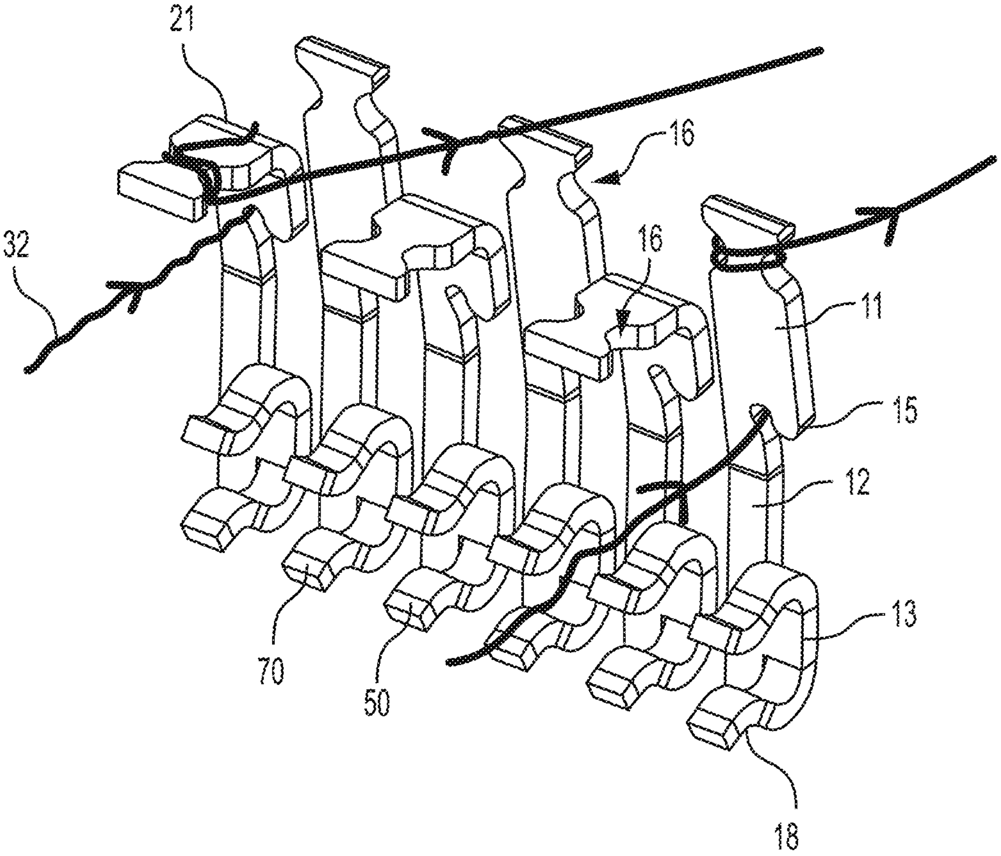
FIG. 17 is a perspective view of a winding wound around the edge-fit pins of FIG. 11.

The pins 10, 30, 50, 70 each include a head 11, a base 12, a tail 13, and a leg 14. The head 11 can include a hook 15, two side notches 16, and an end notch 17. The head 11 can include two or more structures selected from the hook 15, the two side notches 16, and the end notch 17 so that a winding can be wound around the head 11. The hook 15, the side notches 16, and the end notch 17 can have any suitable shape or length. Instead of two side 16 notches, either no side notches 17 or a single side notch 17 can be used. The end notch 17 is optional as shown in FIG. 17. The base 12 is between the head 11 and tail 13. The tail 13 can include clasps 18 that can be attached to a side of a substrate. Any suitable clasps 18 can be used. It is possible to use additional clasps 18. For example, additional clasps 18 can be added to the pins 10, 30, 50, 70 opposite to the side with the hook 15. Instead of having the clasps 18 on the same side of the pins 10, 30, 50, 70 as the hook 15, it is possible to position the clasps 18 on the opposite side of the pins 10, 30, 50, 70 as the hook 15. The leg 14 extends from the tail 13, is optional, and can be used as a standoff, if included. For example, only one of the pins 10 or 30 (and only one of the pins 50 or 70) can include a leg 14. The pins 10, 30, 50, 70 can have any number of bends and at any angle so that, when connected to a substrate, the distance between the tips of the pins is larger than the distance between locations where the pins are connected to the substrate. Examples of specific bends and specific angles are discussed below.

Figure 9:
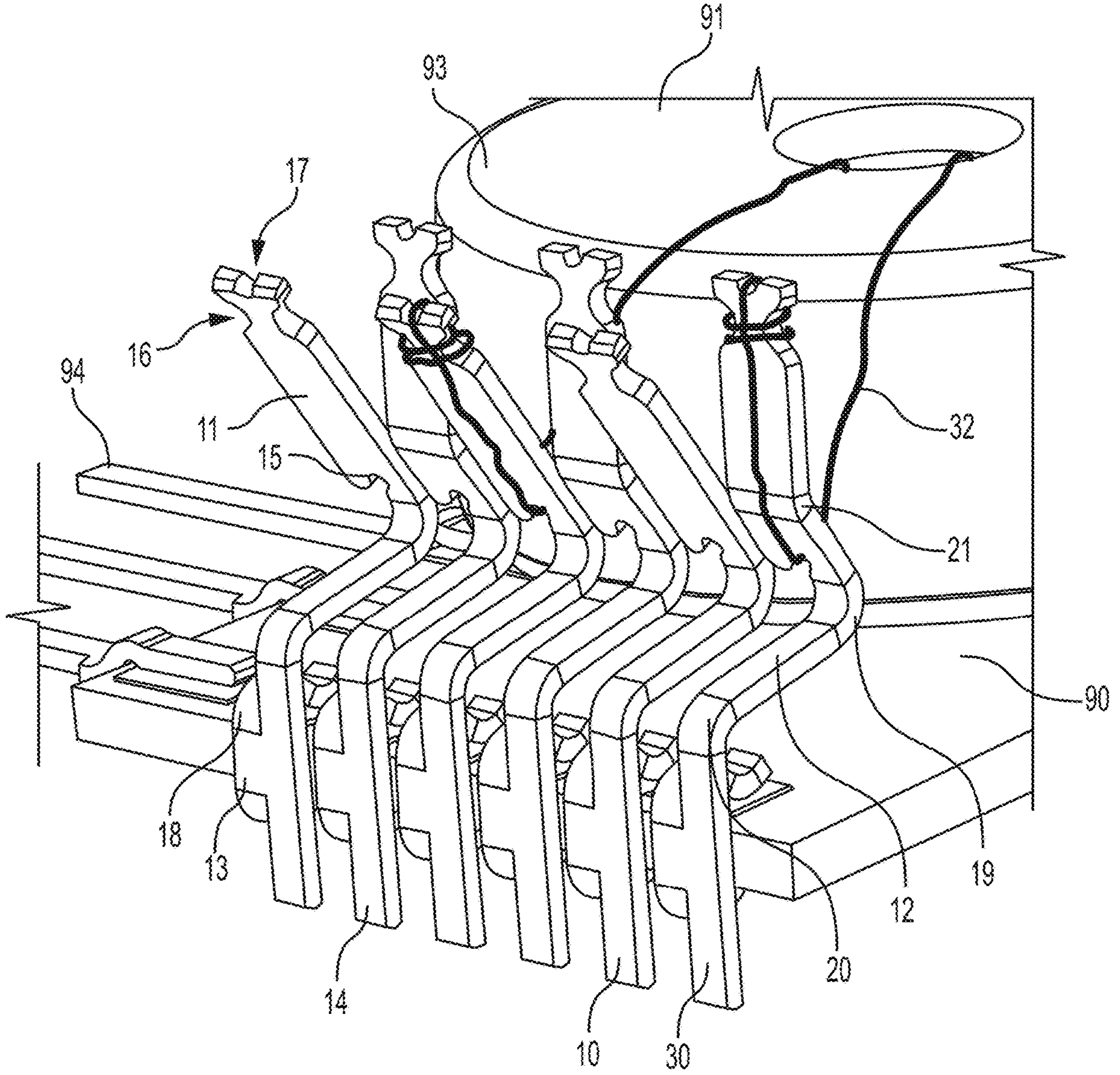
FIGS. 9 and 10 are a perspective view and a side view of a winding wound around the edge-fit pins of FIG. 3.
Figure 10:
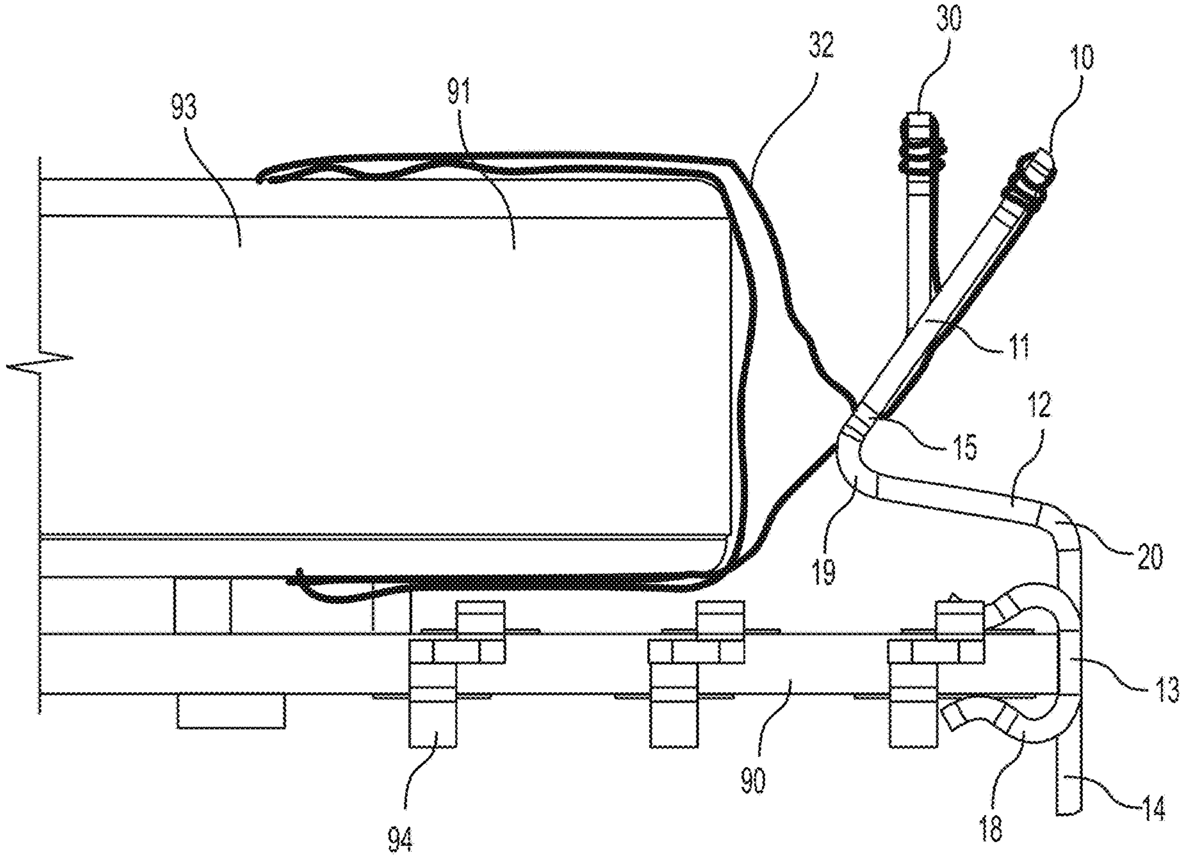

As shown in FIGS. 9, 10, and 17, a winding 32 can be wound around the pins 10, 30, 50, 70. The winding 32 can be wound around the hook 11 and around one or both of the two side notches 16 and the end notch 17. As shown in FIGS. 9 and 10, the winding 32 can be wound around the hook 15, the two side notches 16, and the end notch 17. If only one side notch 16 is used, then the winding 32 can be wound around the hook 15, the side notch 16, and the end notch 17.

As shown in FIG. 17 without end notches 17, the winding 32 can be wound around the hook 15 and the two side notches 16. If no side notches 16 are used, then the winding 32 can be wrapped around the hook 15 and the end notch 17, which would require a longer length of winding because the distance between the hook 15 and the end notch 17 is greater than the distance between side notches 16. The winding 32 can be wound around any combination of the hook 15, the side notches 16, and the end notch 17.

As shown in FIGS. 3-6, the pins 10, 30 can include bends 19, 20. Bend 19 can connect the head 11 with the base 12, and bend 20 can connect the base 12 and the tail 13. The bends 19, 20 in the pin 10 can bend at the same angle or can bend at different angles as the bends 19, 20 in the pin 30. If the bends 19, 20 in the pins 10, 30 are at the same angle, then the pins 10, 30 can be easier to manufacture. The bends 19 in the pins 10, 30 can bend between 0° and 90°, i.e., the angle between the head 11 and the base 12 can be between 0° and 90°. The bends 20 in the pins 10, 30 can bend at 90° or about 90° within manufacturing tolerances such that the base 12 is parallel or substantially parallel to the top surface of the substrate to which the pins 10, 30 are attached. The bends 20 can be at other angles. But if the bends 20 are at 90° or about 90°, then the bends 19 in the pins 10, 30 can be smaller, providing more room between the tips of the pins 10, 30 to wind the windings.

Figure 1:
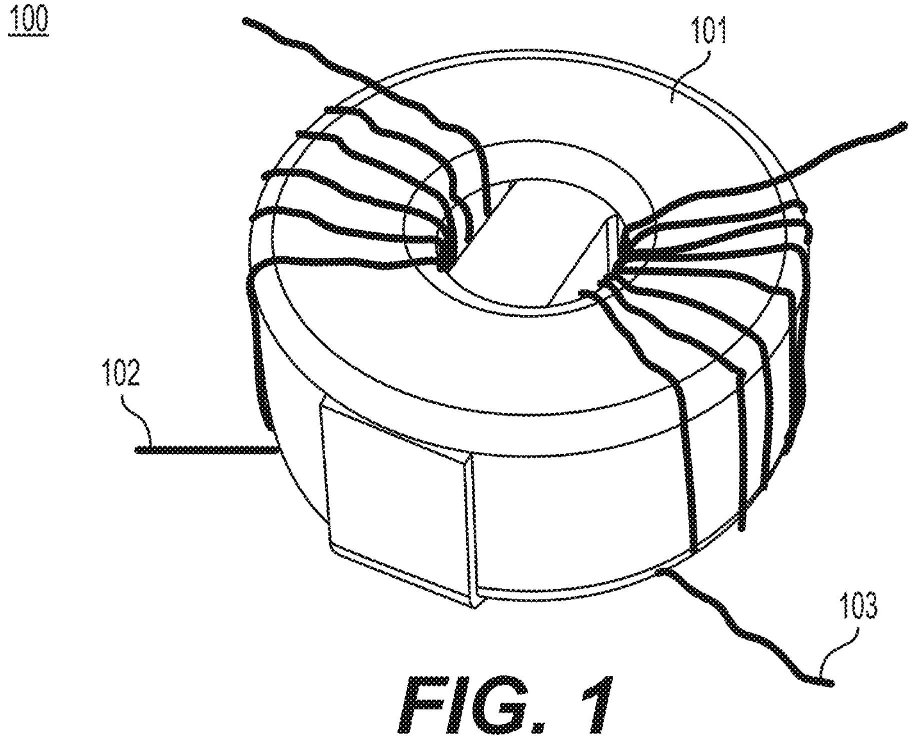
FIG. 1 PRIOR ART
FIG. 1 shows a known core cup with windings wound around the core cup.
Figure 2:
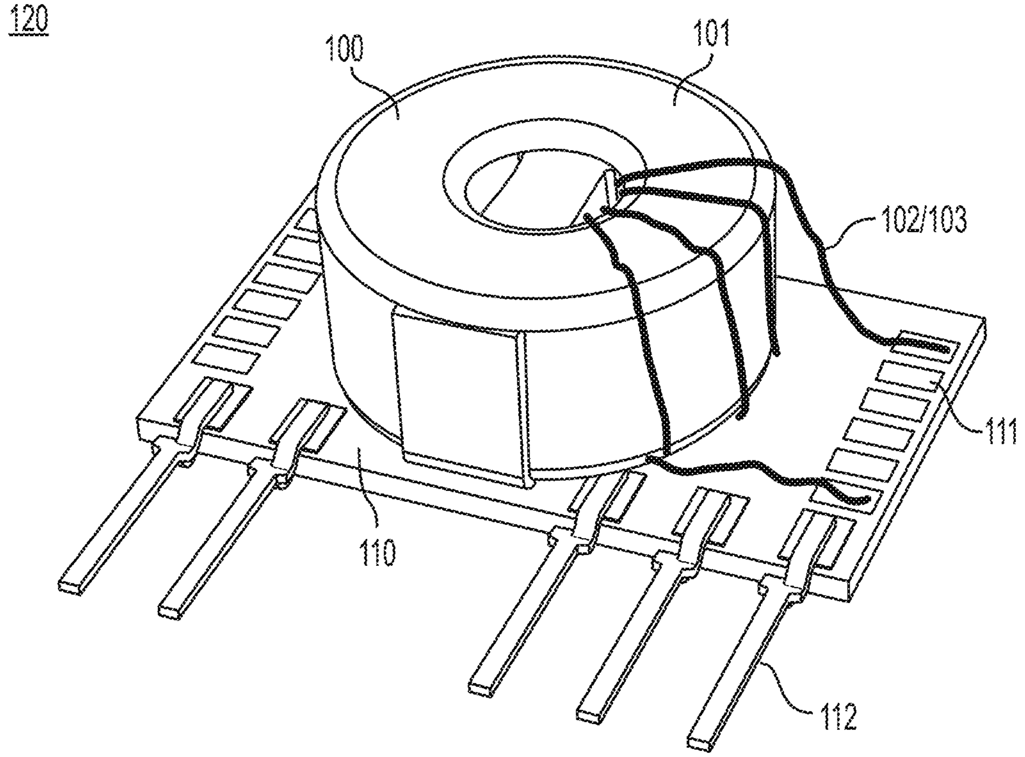
FIG. 2 PRIOR ART
FIG. 2 shows a known core attached to a printed circuit board with the windings soldered to the printed circuit board.
Figure 3:
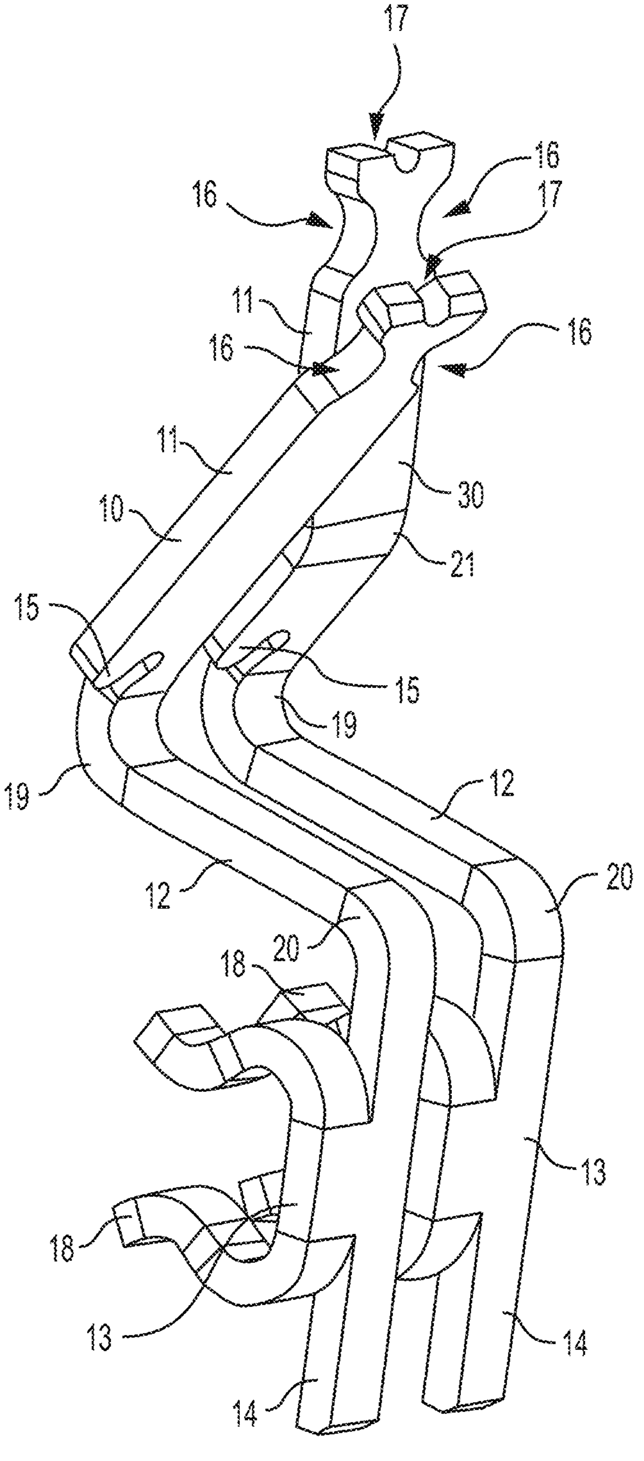
FIGS. 3 and 4 are perspective views of a pair edge-fit pins according to a first preferred embodiment of the present invention.
Figure 4:
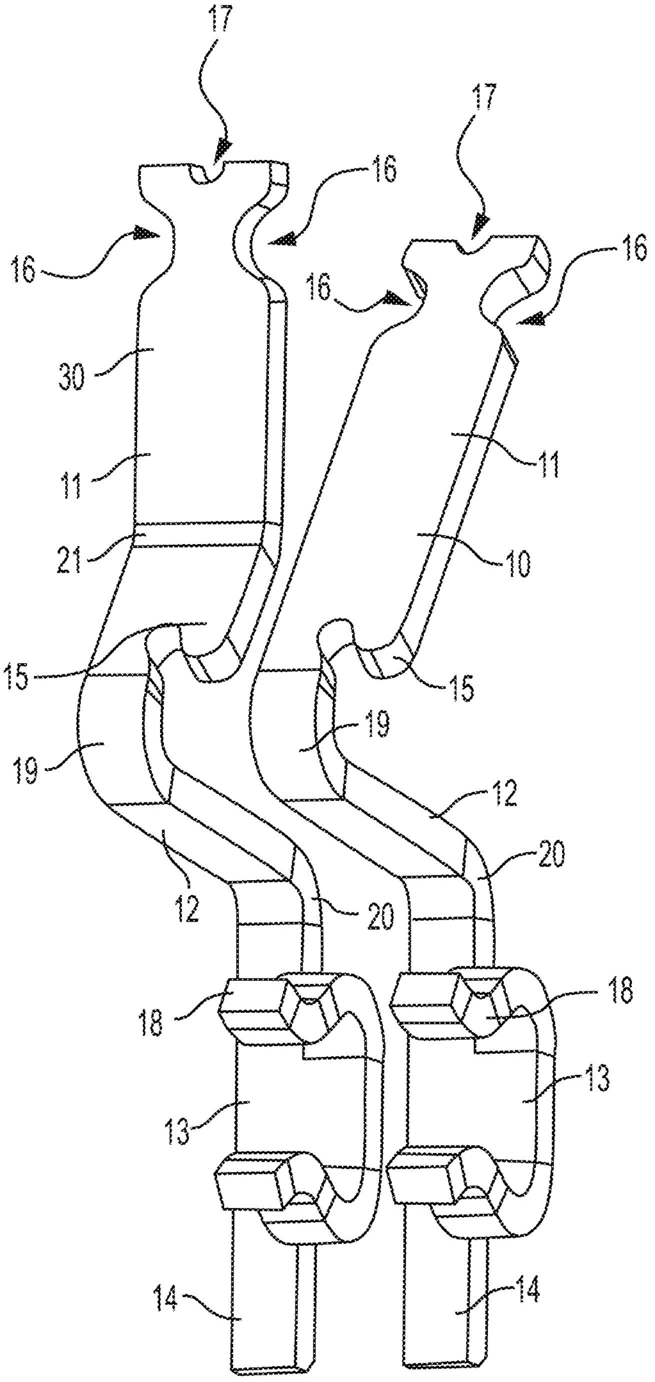
Figure 5:
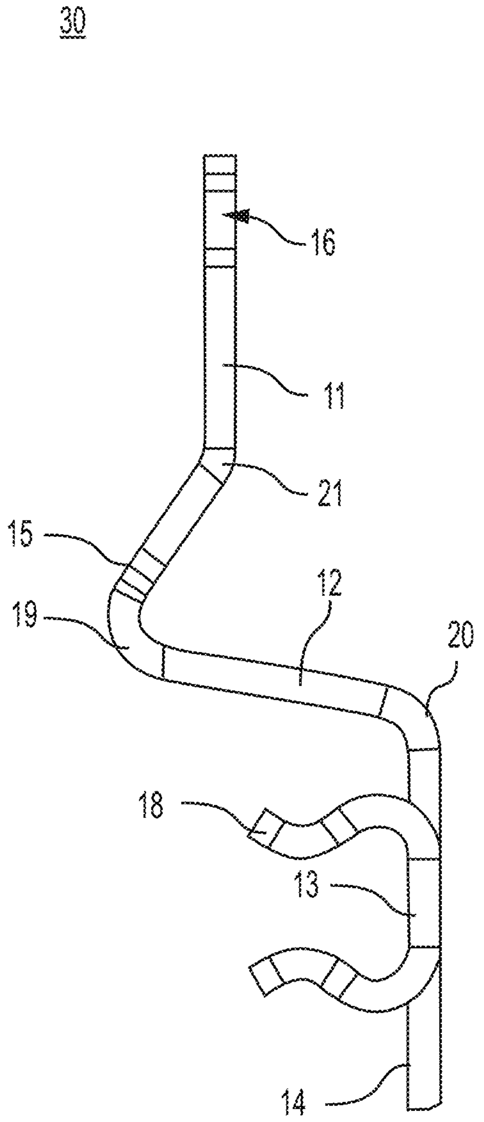
FIGS. 5 and 6 are respective side views of the pair of edge-fit pins of FIG. 3.
Figure 6:
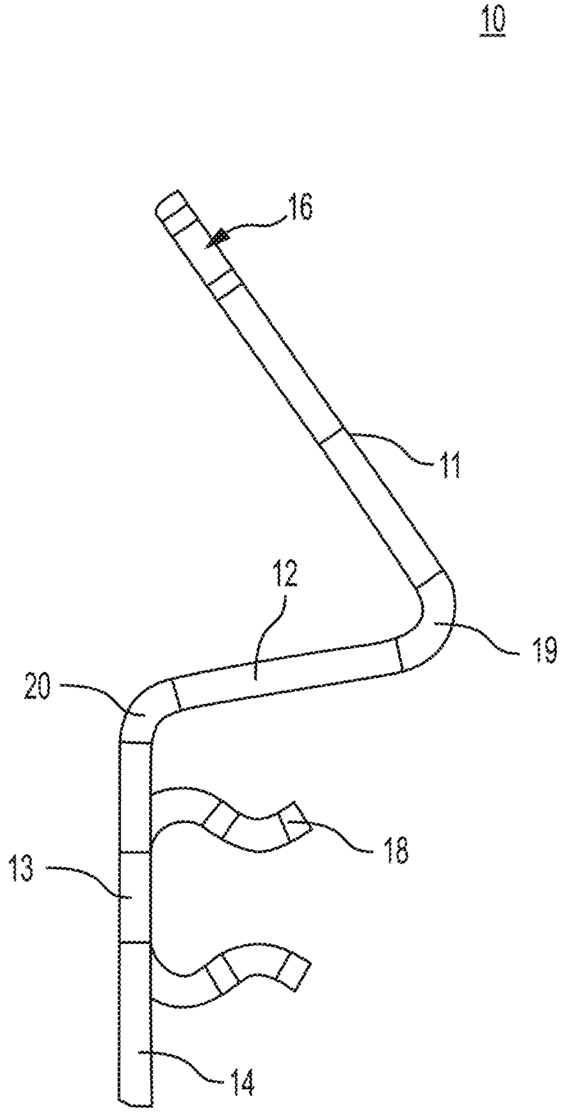

As shown in FIG. 3-5, the head 11 of the pin 30 can include a bend 21. The bend 21 can be such that the tip of the head 11 of the pin 30 is parallel or substantially parallel within manufacturing tolerances to the leg 13 of the pin 30, which is perpendicular or substantially perpendicular within manufacturing tolerances to the top surface of the substrate to which the pin 30 is attached. For example, if the bend 20 is at 90° and if the bend 19 between $0° < \alpha < 90°$, then the bend 21 can be at $\alpha + 90°$, i.e., the bend 21 can be between 90° and 180°.

As shown in FIGS. 11-14, the pins 50, 70 can include a bend 19. Bend 19 can connect the head 11 with the base 12. The base 12 and the tail 13 can be connected without a bend. But it is also possible that the base 12 and the tail 13 can be connected by a bend. The bend 19 in the pin 50 can bend at the same angle or can bend at different angles as the bend 19 in the pin 70. If the bends 19 in the pins 50, 70 are at the same angle, then the pins 50, 70 can be easier to manufacture. The bends 19 in the pins 50, 70 can bend between than 90° and 180°.

Figure 11:
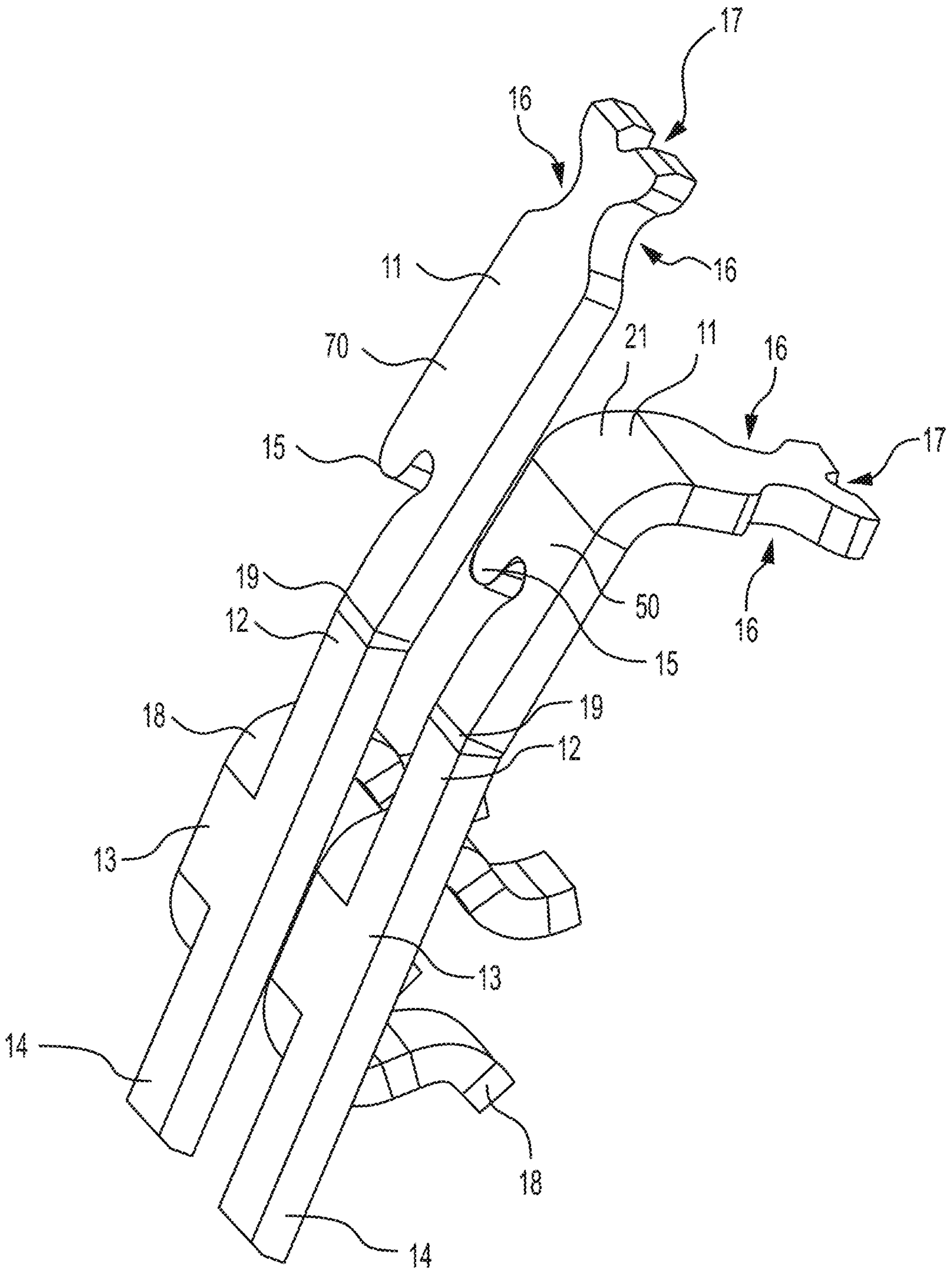
FIGS. 11 and 12 are perspective views of a pair edge-fit pins according to a second preferred embodiment of the present invention.
Figure 12:
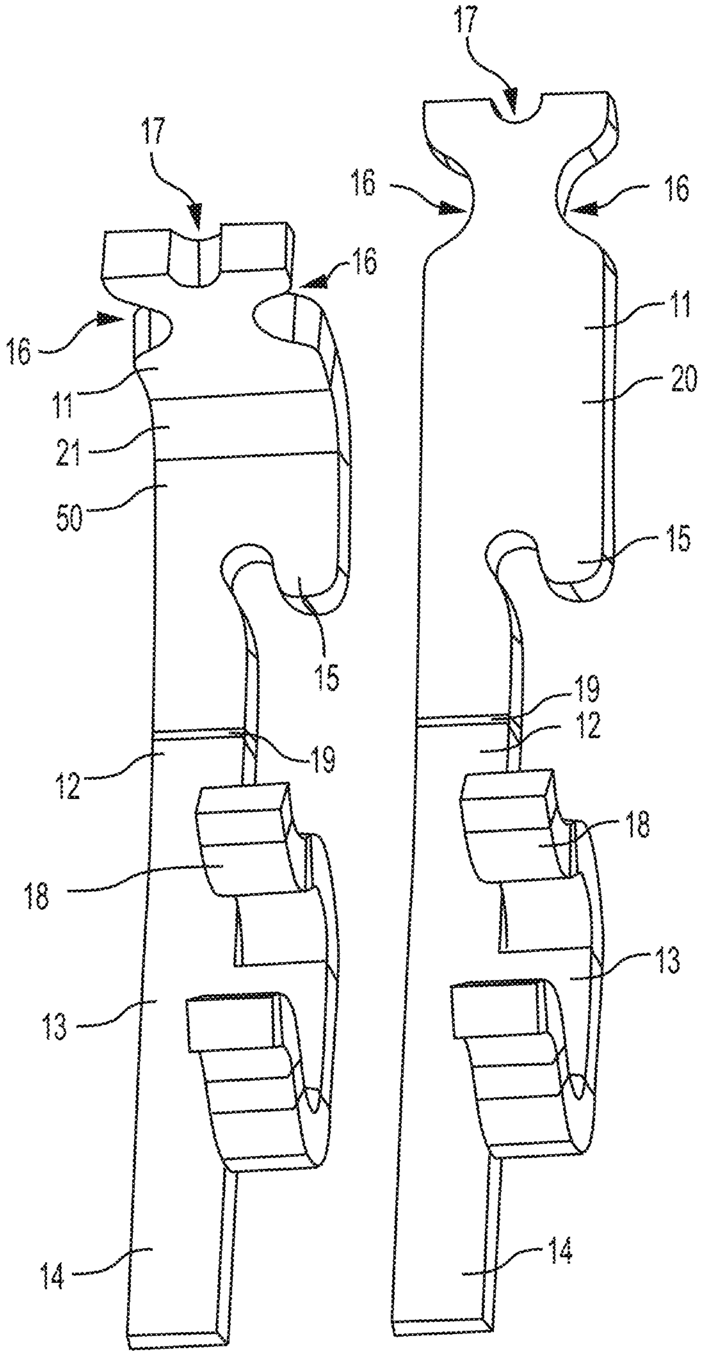
Figure 13:
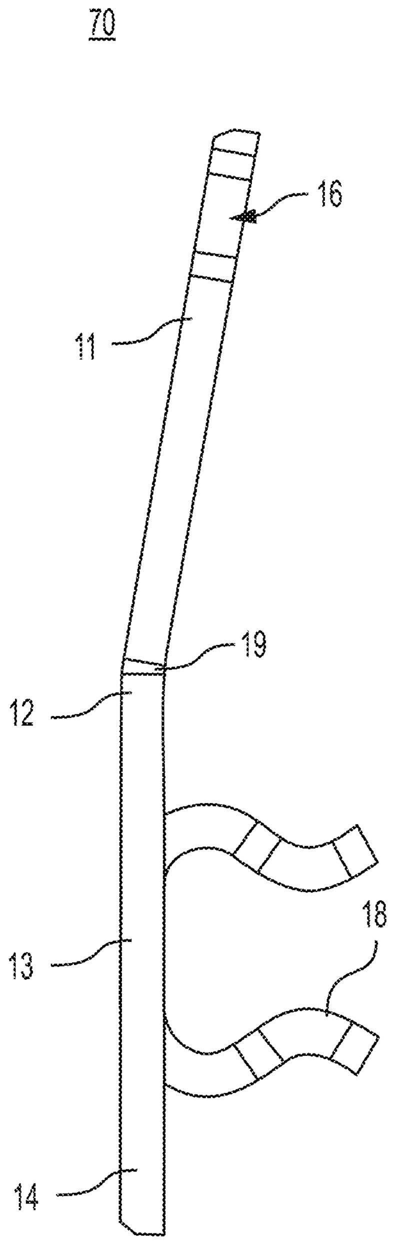
FIGS. 13 and 14 are respective side views of the pair of edge-fit pins of FIG. 11.
Figure 14:
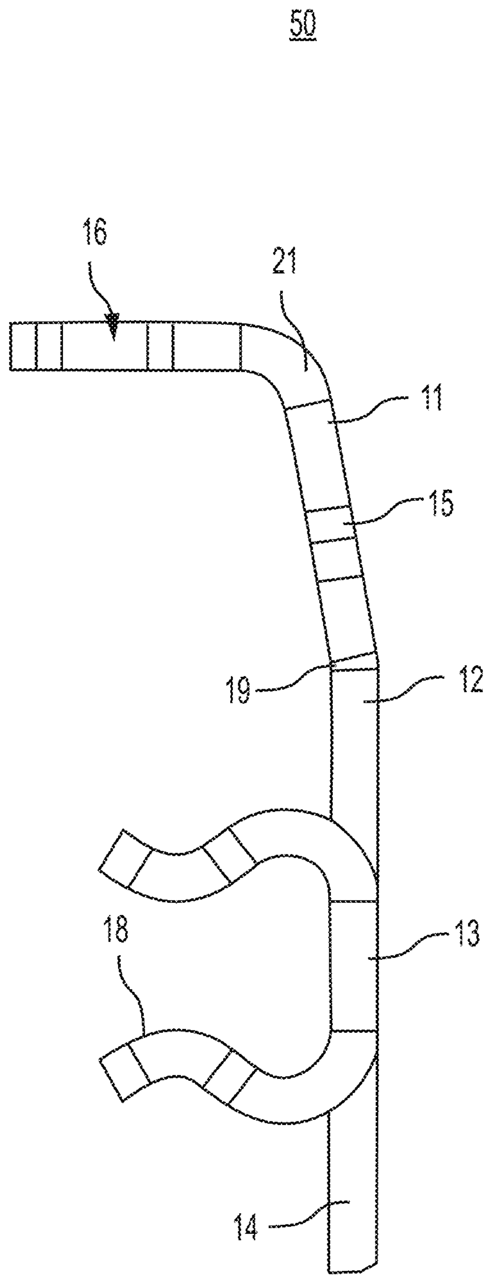

As shown in FIGS. 11, 12, and 14, the head 11 of the pin 50 can include a bend 21. The bend 21 can be such that the tip of the head 11 of the pin 50 is perpendicular or substantially perpendicular within manufacturing tolerances to the leg 13 of the pin 50, which is perpendicular or substantially perpendicular within manufacturing tolerances to the top surface of the substrate to which the pin 50 is attached. For example, if the bend 19 at $90° < \alpha < 180°$, then the bend 21 can be at $270° - \alpha$, i.e., the bend 21 can be between 90° and 180°.

Figure 7:
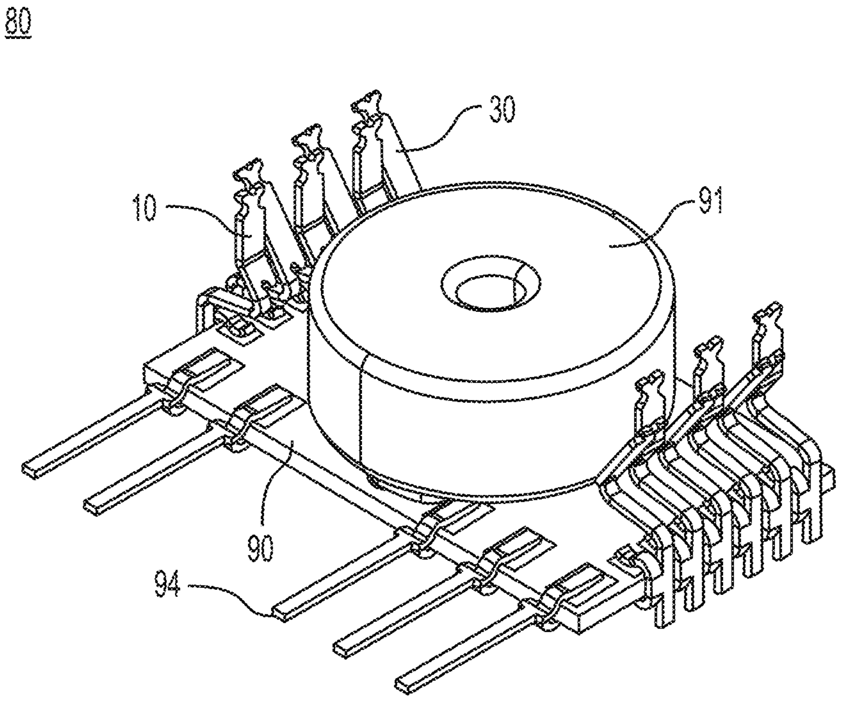
FIG. 7 is a perspective view of a module without a casing and with the edge-fit pins of FIG. 3.
Figure 8:
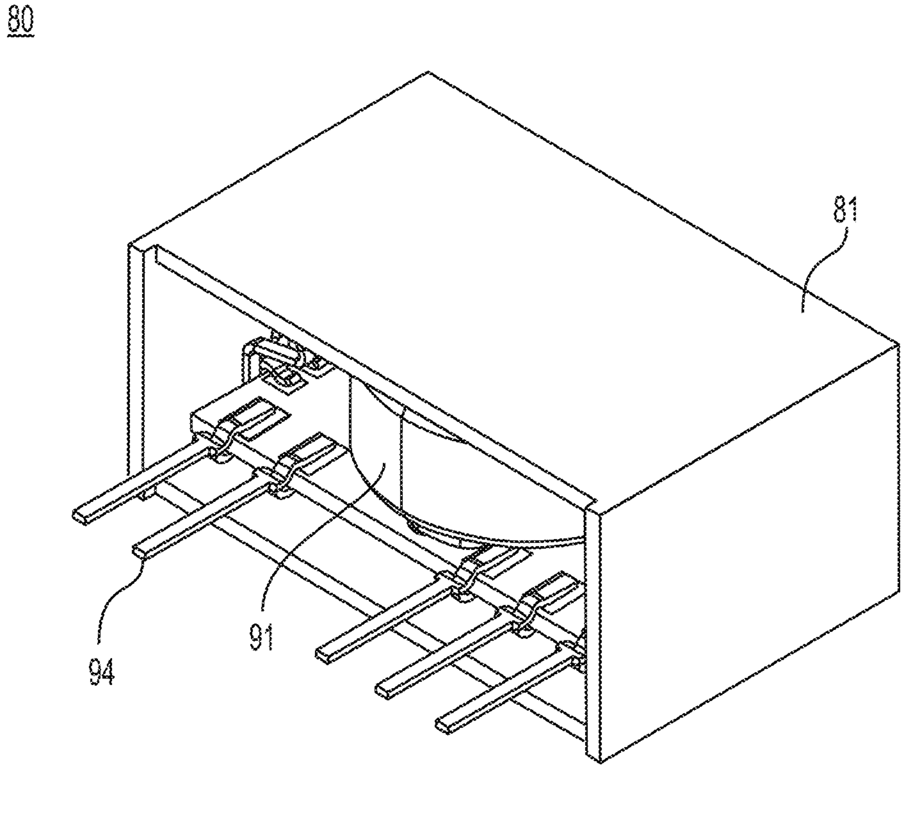
FIG. 8 is a perspective view of the module of FIG. 7 with a casing.
Figure 15:
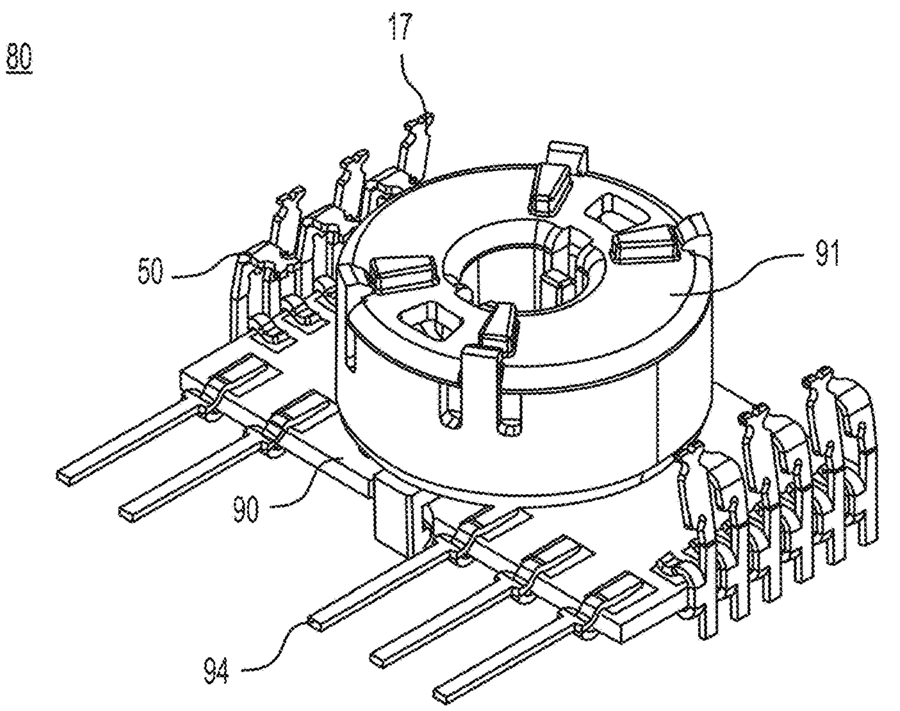
FIG. 15 is a perspective view of a module without a casing and with the edge-fit pins of FIG. 11.
Figure 16:
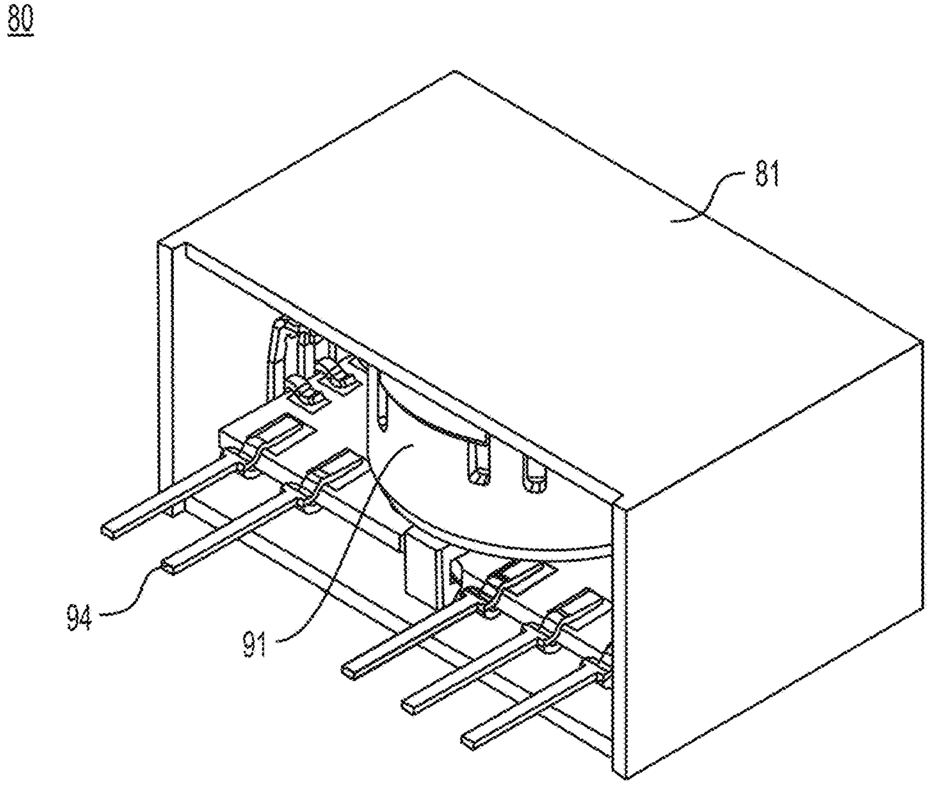
FIG. 16 is a perspective view of the module of FIG. 16 with a casing.

FIGS. 7, 8, 15, 16 show a module 80 including a substrate 90, terminals 94, transformer 91, a first row of six pins 10, 30 or 50, 70 arranged along one side of a substrate 90, and a second row of six pins 10, 30 or 50, 70 arranged along another side of the substrate 90. FIGS. 8 and 16 show the module 80 with a casing 81. The module 80 can be any type of module, including those disclosed in the two U.S. Provisional Patent Applications: Lee Francis et al., "ENCLOSURE FOR ISOLATING TRANSFORMER CORE FROM WINDINGS," U.S. Provisional Patent Application No. 63/041,435, filed on Jun. 19, 2020; and Lee Francis, "ENCLOSURE FOR ISOLATING TRANSFORMER CORE FROM WINDINGS," U.S. Provisional Patent Application No. 63/041,438, filed on Jun. 19, 2020.

As shown in FIGS. 7-10, 15, and 16, the pins 10, 30, 50, 70 can be attached to a side of a substrate 90 to engage with solder lands on the substrate 90. The pins 10, 30, 50, 70 can be attached to the substrate 90 by any suitable method, including, for example, laser soldering, dip-soldering, welding, etc.

The substrate 90 can be a PCB or any other suitable substrate. Although not shown in FIGS. 7, 8, 15, and 16, electrical components can be attached to the substrate 90 opposite to the transformer 91. For example, if the module 80 is a converter, then the electrical components can be the electrical components of a converter, including, for example, active components such as power switches and synchronous rectifiers and passive components such as resistors, capacitors, inductors, and diodes.

Terminals 94 can be attached to the substrate 90 and can be used to attach the module 80 to another device, e.g., a host substrate or PCB (not shown). FIGS. 7, 8, 15, and 16 show five terminals 94, but any number of terminals can be used. Terminals 94 can be edge-fit pins that fit on the edge of the substrate 90. Other suitable types of terminals can also be used.

The transformer 91 can be attached to the substrate 90 in any suitable manner. For simplicity, in FIGS. 8 and 9, the transformer 91 is shown with only one winding 32 wound around the core 93. The winding 32 can be an insulated copper wire, but any other suitable wire can be used. The insulation of the wire can be removed so that the winding 32 can be attached to one of the pins 10, 30, 50, 70. The insulation of the wire can be removed before the winding 32 is attached to one of the pins 10, 30, 50, 70. Alternatively, in some circumstances, the insulation might be removed during the same process as the winding 32 being soldered or welded to one of the pins 10, 30, 50, 70. Additional windings, including primary and auxiliary windings, can be used. Also, although not shown in FIGS. 8 and 9, the windings can include more than two terminations that need to be connected to the substrate 90. FIGS. 9 and 10 show that the winding 32 includes three turns, but any number of turns can be used.

FIGS. 7 and 15 show first and second rows of pins 10, 30, 50, 70 arranged along different sides of the substrate 90. It is possible to use different numbers and/or different arrangements of pins. For example, six pins 10, 30, 50, 70 can be arranged on a primary side of the transformer 31 to provide starting, center-tap, and ending connections for both primary and auxiliary windings, and three pins 10, 30, 50, 70 can be arranged on a secondary side of the transformer 91 to provide starting, center-tap, and ending connections for a secondary winding. Instead of having a single row of six pins 10, 30, 50, 70, two rows of three pins 10, 30, 50, 70 could also be used. The pitch of the pins 10, 30, 50, 70 on the substrate 90 can be about 1.27 mm, but other pitches are also possible. The smaller the pitch, the smaller the module 80 can be made. The two rows of pins 10, 30, 50, 70 can have different pitches. For example, if there are six pins 10, 30, 50, 70 in the row on the primary side and if there are three pins 10, 30, 50, 70 in the row on the secondary side, then the pins 10, 30, 50, 70 in the row on the primary side can have a 1.27-mm pitch, and the pins 10, 30, 50, 70 in the row on the secondary side can have a 2.54-mm pitch. Alternatively, the pins 10, 30, 50, 70 can be placed individually around the substrate 90.

Figure 18:
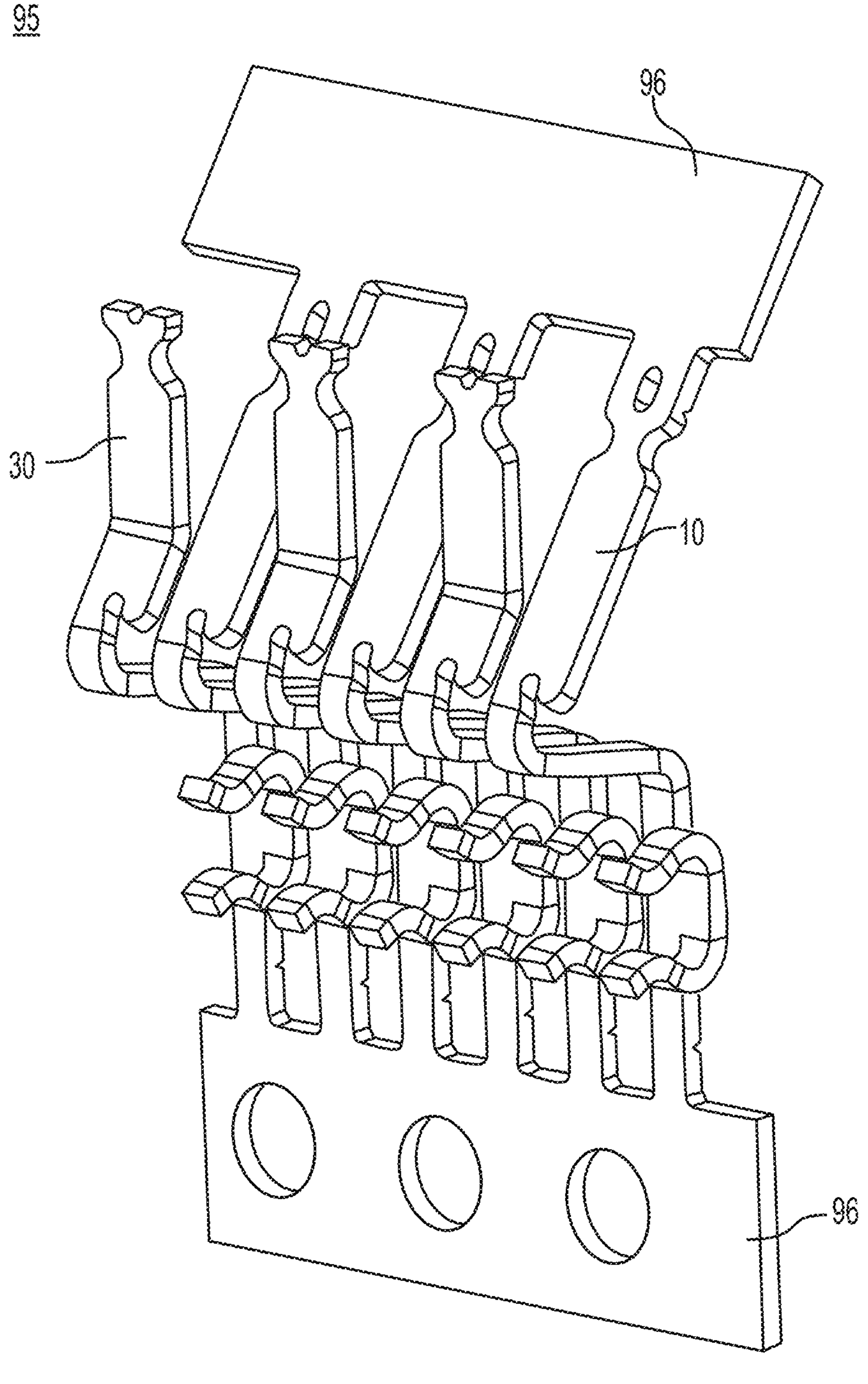
FIG. 18 is a perspective view of a strip of pins of FIG. 3.
Figure 19:
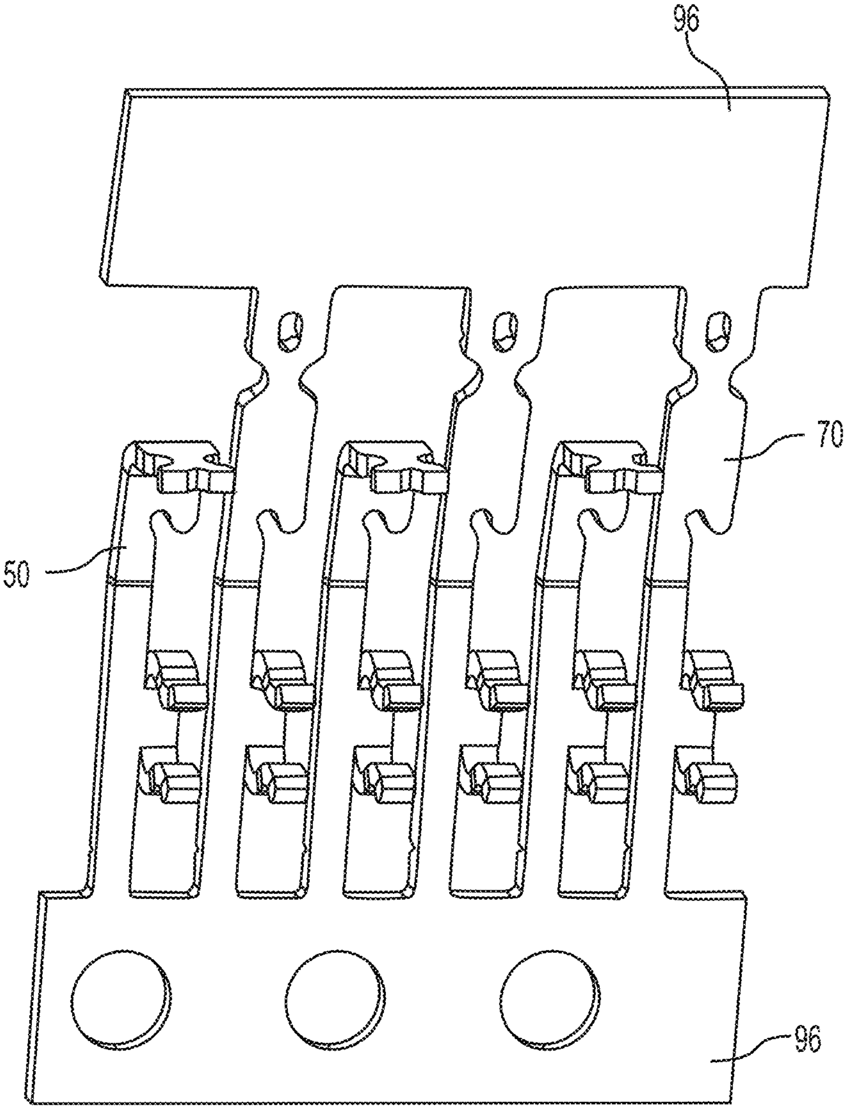
FIG. 19 is a perspective view of a strip of pins of FIG. 11.

As shown in FIGS. 18 and 19, the pins 10, 30, 50, 70 can be mass-produced by stamping/forming and come in reels or strips 95. The strips 95 can be defined with a fixed number of pins 10, 30, 50, 70. The pins 10, 30, 50, 70 can all be connected by top/bottom tie bars 96. The tie bars 96 can include scores which enable the tie bars to be snapped off. Alternatively, the tie bars 96 can be cropped off. Pins 10, 30, 50, 70 can be fitted to the substrate 90 while still connected together, maintaining pin pitch. For example, a strip of six pins 10, 30, 50, 70 can be pushed onto the side of the substrate, the tie bars 96 are then removed, and then the pins 10, 30, 50, 70 can be soldered to the substrate. Alternatively, the top tie bar 96 can removed after the pins 10, 30, 50, 70 are soldered to the substrate. Pins 10, 30, 50, 70 can be cropped out of a strip 95, leaving space(s). For example, one of the pins 10, 30, 50, 70 can be cropped out before being pushed onto the side of substrate, resulting in a row of five pins 10, 30, 50, 70, with a space between pins 10, 30, 50, 70 or at the end of the row of pins 10, 30, 50, 70. FIGS. 18 and 19 only show holes in the bottom tie bar 96, but the top tie bar 96 can also have holes. The top tie bar 96 can be attached to either pin 10, 70 (as shown in FIGS. 18 and 19) or pin 30, 50.

FIGS. 9, 10, and 17 show the winding 32 of the transformer 91 wrapped around two pins 10, 30, 50, 70. For simplicity, the winding 32 shown in FIGS. 9, 10, and 17 is not center-tapped, so the winding 32 is wrapped around only two pins 10, 30, 50, 70. If the winding 32 is center-tapped, then the winding 32 can be wrapped around a third pin 10, 30, 50, 70. Alternatively, the winding 32 can include two wires each being wrapped around two pins 10 for a total four pins 10, 30, 50, 70, and two of the pins 10, 30, 50, 70 can be directly electrically connected on or within the substrate 90 to define a center tap of the winding 32. The winding 32 can be wrapped around the pins 10, 30, 50, 70 such that there is no tension in the winding 32 between the pins 10, 30, 50, 70 and the transformer 91.

Although FIGS. 7, 8, 15, and 16 show the pins 10, 30, 50, 70 being used with a transformer 91, the pins 10, 30, 50, 70 can be used with any other device that includes a wire that needs to be connected to a substrate. That is, any type of suitable wire can be wound around the pins 10, 30, 50, 70.

FIGS. 9, 10, and 17 show a possible winding arrangement of the winding 32. In FIGS. 9 and 10, the winding 32 is wrapped around the hook 15, through the end notch 17, and around the side notches 16 so that the winding 32 extends along the head 11. In FIG. 17, the winding 32 is wrapped around the hook 15 and then around the side notches 16 so that the winding 32 extends along the head 11. As discussed above, other winding arrangements are also possible. The winding 32 can be soldered to the head 11. For example, the pins 10, 30, 50, 70 can be solder-dipped to make soldering the wire easier. The winding 32 can be soldered to the pin 10 by hand or can be soldered using, for example, laser soldering or wave soldering, which can be automated.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A module comprising:

a substrate;

a pin mounted to the substrate and including:

a head;

a base connected to the head;

a tail connected to base;

clasps extending from the tail; and a first bend that connects the base and the head; and a wire wound around the pin, wherein the head includes two or more structures selected from a group consisting of a hook, a first side notch, a second side notch, and an end notch.

2. The module of claim 1, further comprising a leg extending from a bottom of the tail.

3. The module of claim 1, wherein the first bend is between 0° and 90°.

4. The module of claim 1, wherein the first bend is between 90° and 180°.

5. The module of claim 1, wherein the head includes a second bend that is between 90° and 180°.

6. The module of claim 1, wherein the wire is wound around the two or more structures.

7. The module of claim 1, wherein the wire is soldered to the pin.

8. The module of claim 1, further comprising a casing that surrounds the substrate.

9. The module of claim 1, wherein the two or more structures include the hook, the first side notch, and the second side notch.

10. The module of claim 9, wherein the two or more structures include the end notch.

11. The module of claim 1, further comprising a second bend that connects the base and the tail and that is 90° or about 90°.

12. The module of claim 11, wherein the head includes a third bend that is between 90° and 180°.

13. The module of claim 1, further comprising a transformer; wherein the wire is a winding of the transformer.

14. The module of claim 13, further comprising an additional pin mounted on the substrate; wherein the wire is wound around the additional pin; and a distance between a tip of the pin and a tip of the additional pin is greater than a distance between locations where the pin and the additional pin are mounted to the substrate.

15. A strip comprising:

first and second pins, each pin including:

a head;

a base connected to the head;

a tail connected to base;

clasps extending from the tail; and a first bend that connects the base and the head; wherein the head includes two or more structures selected from a group consisting of a hook, a first side notch, a second side notch, and an end notch; and when the first and second pins are respectively mounted to first and second locations on a substrate, a distance between tips of the first and second pins is greater than a distance between the first and second locations.

16. A module comprising:

a substrate;

a first pin mounted to the substrate at a first location; and a second pin mounted to the substrate at a second location; wherein a distance between a tip of the first pin and a tip of the second pin is greater than a distance between the first location and the second location; and each of the first pin and the second pin includes two or more structures selected from a group consisting of a hook, a first side notch, a second side notch, and an end notch.

17. The module of claim 16, wherein the first pin and the second pin have different heights as measured from the substrate.

18. The module of claim 16, further comprising a wire wound around the tip of the first pin and the tip of the second pin.

19. The module of claim 18, further comprising a transformer; wherein the wire is a winding of the transformer.

* * * * *